(12) United States Patent
Ding et al.

(10) Patent No.: US 9,473,948 B2
(45) Date of Patent: Oct. 18, 2016

(54) METHOD AND APPARATUS FOR ANALYZING PILOT POLLUTION

(71) Applicant: Huawei Technologies Co., Ltd., Shenzhen, Guangdong (CN)

(72) Inventors: Junquan Ding, Shenzhen (CN); Xiaojun Cui, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 456 days.

(21) Appl. No.: 13/899,167

(22) Filed: May 21, 2013

(65) Prior Publication Data

US 2013/0314432 A1    Nov. 28, 2013

Related U.S. Application Data

(63) Continuation of application No. PCT/CN2012/082649, filed on Oct. 9, 2012.

(30) Foreign Application Priority Data

May 28, 2012  (CN) .......................... 2012 1 0168702

(51) Int. Cl.
    H04W 16/18    (2009.01)
    H04W 24/10    (2009.01)
    G06T 11/40    (2006.01)

(52) U.S. Cl.
    CPC .............. *H04W 16/18* (2013.01); *G06T 11/40* (2013.01); *H04W 24/10* (2013.01)

(58) Field of Classification Search
    CPC ... H04W 16/18; H04W 24/02; H04W 24/10; H04W 24/08; H04W 24/06; H04W 52/325
    See application file for complete search history.

(56) References Cited

U.S. PATENT DOCUMENTS 6,346,198 B1    2/2002  Watson et al.
2003/0231311 A1  12/2003  Tucker
(Continued)

FOREIGN PATENT DOCUMENTS

CN    1482825 A      3/2004
CN    101141775 A  *  3/2008

OTHER PUBLICATIONS

ETSI TS 137 320 v10.1.0 (Apr. 2011)—Universal Mobile Telecommunicaiton System; LTE; UTRA and E-UTRA; Radio measurement collection for minimization of drive tests (MDT); Stage 2 (3GPP TS 37.320 version 10.1.0 Release 10).*

(Continued)

*Primary Examiner* — Nizar Sivji

(57) ABSTRACT

Embodiments of the present invention disclose a method for analyzing pilot pollution, and further disclose an apparatus for analyzing pilot pollution. The method includes: generating a preprocessed map according to an actual engineering parameter table and drive test data that are in pre-imported information, where the preprocessed map includes a cell distribution map and a pilot pollution distribution map, the actual engineering parameter table includes actual longitude information, actual latitude information, and actual azimuth information; obtaining selection information of a target area to determine the target area; and generating, for the target area, a map of abnormal cells of the target area according to the cell pilot identifiers and the signal strength corresponding to the pilot identifier of each test-marked cell. With the present invention, it is unnecessary to review test data and view the review connection, and the analysis efficiency is high.

13 Claims, 5 Drawing Sheets

(56) References Cited

U.S. PATENT DOCUMENTS

| | | |
|---|---|---|
| 2007/0151326 A1 | 7/2007 | Kim et al. |
| 2008/0176583 A1* | 7/2008 | Brachet et al. ............ 455/456.3 |
| 2008/0220782 A1* | 9/2008 | Wang et al. ................. 455/436 |
| 2009/0227251 A1 | 9/2009 | Lei et al. |
| 2010/0043573 A1 | 2/2010 | Carichon et al. |
| 2011/0212720 A1* | 9/2011 | Hamalainen et al. ........ 455/423 |
| 2011/0217789 A1 | 9/2011 | Tovena-Pecault |
| 2014/0043982 A1* | 2/2014 | Bodog et al. ................. 370/242 |
| 2014/0287694 A1* | 9/2014 | Kim et al. ................. 455/67.13 |

OTHER PUBLICATIONS

"WCDMA Network Wireless Environment Evaluation Method and Application", Jan. 10, 2010, 26 pages.

International Search Report and Written Opinion of the International Searching Authority dated Jan. 3, 2013 in connection with International Patent Application No. PCT/CN2012/082649.

"The Analysis and Solution to Pilot Frequency Pollution of Indoor Coverage in CDMA System", Jul. 2008, 65 pages.

"WCDMA network Thesis: Chaohu Unicom WCDMA Radio Network Planning", Oct. 16, 2013, 11 pages.

* cited by examiner

METHOD AND APPARATUS FOR ANALYZING PILOT POLLUTION

CROSS-REFERENCE TO RELATED APPLICATIONS

This application is a continuation of International Application No. PCT/CN2012/082649, filed on Oct. 9, 2012 which claims priority to Chinese Patent Application No. 201210168702.1, filed on May 28, 2012, both of which are hereby incorporated by reference in their entireties.

FIELD OF TECHNOLOGY

The present invention relates to the radio communication field, and in particular, to a method and an apparatus for analyzing pilot pollution.

BACKGROUND

Pilot pollution is caused by equal strengths of signals received in an area. At an initial stage of network construction, pilot pollution is the first difficult issue to be solved in radio optimization, and a lot of labor and material resources are needed to solve the issue.

In the prior art, a method for analyzing pilot pollution generally includes:

according to a frequently used pilot pollution algorithm in the prior art, outputting and displaying a pilot pollution distribution map in an analysis software interface; and reviewing test data in the analysis software, and obtaining, through the connection of signals received by a UE terminal, abnormal cells that cause pilot pollution in an area. In the prior art, if the abnormal cells that cause pilot pollution in the area are determined, it is necessary to review test data and view the review connection. The analysis efficiency is low, and engineers need to have certain analysis experience.

SUMMARY

The technical issue to be solved by embodiments of the present invention is to provide a method for analyzing pilot pollution. A map of abnormal cells of the target pilot pollution area may be generated by dividing signal strengths into segments, so that the efficiency of analyzing pilot pollution is improved.

To solve the technical issue, an embodiment of the present invention provides a method for analyzing pilot pollution, including:

generating a preprocessed map according to an actual engineering parameter table and drive test data that are in pre-imported information, where the preprocessed map includes a cell distribution map and a pilot pollution distribution map, the actual engineering parameter table includes actual longitude information, actual latitude information, and actual azimuth information, the drive test data is obtained by extracting test marking record information, the test marking is obtained by marking at an interval of a certain period by a drive test device, and the test marking record comprises information, which comprise cell pilot identifiers and signal strength corresponding to each cell pilot identifier;

obtaining selection information of a target area to determine the target area, where the target area is an area to be analyzed in the preprocessed map; and generating, for the target area, a map of abnormal cells of the target area according to the cell pilot identifiers and the signal strength corresponding to the pilot identifier of each test-marked cell, where the cell pilot identifiers correspond to cells on a one-to-one basis.

In another aspect, an embodiment of the present invention provides an apparatus for analyzing pilot pollution, including:

a storing module, adapted to store pre-imported information, where the pre-imported information includes an actual engineering parameter table and drive test data, where the actual engineering parameter table includes actual longitude information, actual latitude information, and actual azimuth information, the drive test data is obtained by extracting test marking record information, the test marking is obtained by marking at an interval of a certain period by a drive test device, and the test marking record comprises information, which comprise cell pilot identifiers and signal strength corresponding to each cell pilot identifier;

a preprocessing module, adapted to generate a preprocessed map according to the actual engineering parameter table and drive test data, where the preprocessed map includes a cell distribution map and a pilot pollution distribution map;

a first determining module, adapted to obtain selection information of a target area to determine the target area, where the target area is an area to be analyzed in the preprocessed map; and an abnormal cell map generating module, adapted to generate, for the target area, a map of abnormal cells of the target area according to the cell pilot identifiers and the signal strength corresponding to the pilot identifier of each cell where the cell pilot identifiers correspond to cells on a one-to-one basis.

Embodiments of the present invention have the following benefits: a map of abnormal cells of the target pilot pollution area is generated according to the cell pilot identifiers and the signal strength corresponding to the pilot identifier of each cell; therefore, it is unnecessary to review test data and view the review connection, and the analysis efficiency is high.

BRIEF DESCRIPTION OF THE DRAWINGS

To illustrate the technical solutions in the embodiments of the present invention more clearly, the accompanying drawings needed for describing the embodiments or the prior art are briefly introduced in the following. Apparently, the accompanying drawings in the following description merely show some embodiments of the present invention, and persons skilled in the art may still derive other drawings from these accompanying drawings without creative efforts.

DETAILED DESCRIPTION

The technical solutions in the embodiments of the present invention are clearly described in the following with reference to the accompanying drawings in the embodiments of the present invention. Apparently, the embodiments to be described are merely a part rather than all of the embodiments of the present invention. All other embodiments obtained by persons skilled in the art based on the embodiments of the present invention without creative efforts shall fall within the protection scope of the present invention.

Figure 1:
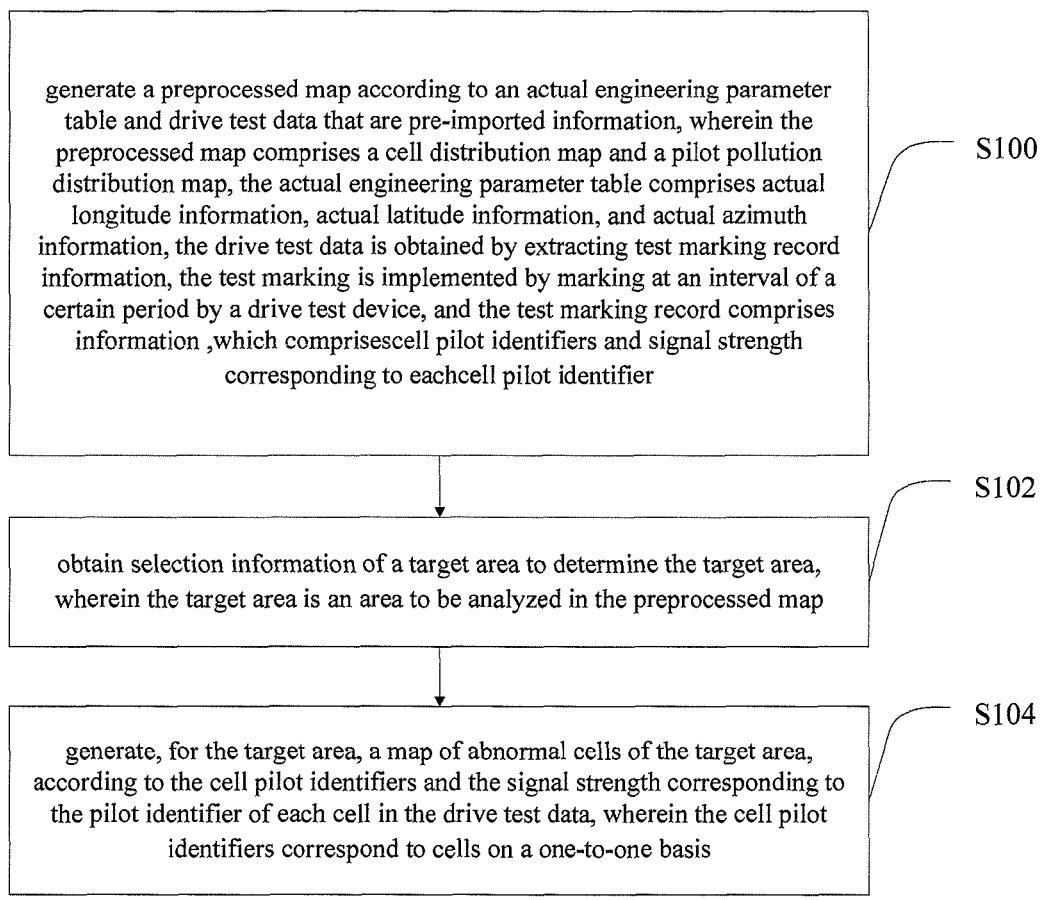
FIG. 1 is a schematic flowchart of an embodiment of a method for analyzing pilot pollution according to the present invention.

FIG. 1 is a schematic flowchart of an embodiment of a method for analyzing pilot pollution according to the present invention. The method for analyzing pilot pollution includes the following:

S100. Generate a preprocessed map according to an actual engineering parameter table and drive test data that are in pre-imported information, where the preprocessed map includes a cell distribution map and a pilot pollution distribution map, the actual engineering parameter table includes actual longitude information, actual latitude information, and actual azimuth information, the drive test data is obtained by extracting test marking record information, the test marking is obtained by marking at an interval of a certain period by a drive test device, and the test marking record comprises information, which comprise cell pilot identifiers and signal strength corresponding to each cell pilot identifier.

S102. Obtain selection information of a target area to determine the target area, where the target area is an area to be analyzed in the preprocessed map.

S104. Generate, for the target area, a map of abnormal cells of the target area according to the cell pilot identifiers and the signal strength corresponding to the pilot identifier of each cell, where the cell pilot identifiers correspond to cells on a one-to-one basis.

The pre-imported information includes at least the actual engineering parameter table and the drive test data, and in some circumstances (for example, if a field picture and/or a simulation effect diagram needs to be output), may include any one or any combination of a planning engineering parameter table, a simulation effect diagram, or a field picture.

Step S100 may include:

extracting longitudes, latitudes, and azimuths from the actual engineering parameter table to generate a cell distribution map; and calculating the drive test data according to the pilot pollution algorithm (for example, the number of pilots that are 10 dbm weaker than the strongest pilot is greater than or equal to 3) to generate a pilot pollution distribution map.

The pre-imported information in step S100 may be pre-stored in the storing module, and the preprocessed map and the map of abnormal cells may be displayed on a display, where the cell distribution map and pilot pollution distribution map may be displayed sequentially or simultaneously, or may also be displayed in the form of a picture after image synthesis. In other embodiments of the present invention, step S100 may also be implemented by using other technical means in the prior art.

In step S102, a selecting/determining operation (for example, keyboard, mouse, and touch interface input) based on the preprocessed map of the user may be received to obtain the selection information of the target area to be analyzed, so that the target area (for example, the pilot pollution area to be analyzed in the preprocessed map) is determined. The selection information of the target area may also be automatically obtained through a preprogrammed program module (for example, through a judging module) to determine the target area to be analyzed.

In other embodiments of the present invention, the preprocessed map or the map of abnormal cells may also be output (or displayed).

Figure 2:
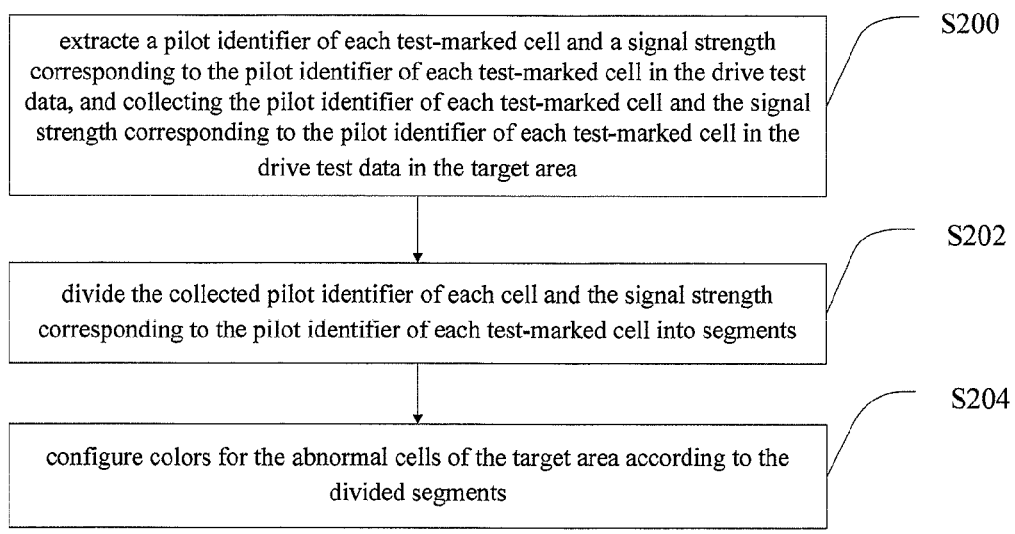
FIG. 2 is a schematic flowchart of a method for generating a map of abnormal cells according to the present invention.

For an implementation method of step S104 in this embodiment, reference may be made to FIG. 2. FIG. 2 is a schematic flowchart of a method for generating a map of abnormal cells according to the present invention. The method includes the following:

S200. Extract a pilot identifier of each test-marked cell and the signal strength corresponding to the pilot identifier of each test-marked cell in the drive test data, and collect the pilot identifier of each test-marked cell and the signal strength corresponding to the cell pilot identifier in the target area.

S202. Divide the collected pilot identifier of each cell and the signal strength corresponding to the pilot identifier of each test-marked cell into segments.

S204. Configure colors for the abnormal cells of the target area according to the divided segments.

What is stored in the drive test data are the service process and the cell signal which is received by the UE in test service, and the cell signal is generated by marking (namely, test-marking) at an interval of a certain period (usually 50 ms). All signal strengths within a receivable range (depending on capabilities of the terminal, usually above −115 dbm) can be received, while all the signals are transmitted by independent cells. The identifier of each cell signal is different (the identifier is a cell pilot identifier). A module extracts, from the test data, the cell pilot identifier and signal strength of each point, and then collects and calculates the cell pilot identifiers and signal strengths in the pilot pollution area (for example, an area with 5 pilots that are 10 dbm weaker than the strongest pilot).

Step S202 in this method may specifically include the following:

(1) Divide the collected signal strengths into more than one segment. For example, the signal strengths may be divided into 3 segments: ≥−70 dbm (greater than or equal to −70 dbm) segment, −80 dbm to −70 dbm (greater than or equal to −80 dbm and smaller than −70 dbm) segment, and −90 dbm to −80 dbm (greater than or equal to −90 dbm and smaller than −80 dbm) segment.

(2) Collect, according to the divided segments, cell pilot identifiers corresponding to the signal strengths that fall within each segment, in order to divide the collected pilot identifier of each cell into segments. Collect, according to the segments divided in step (1) and the mapping between cell pilot identifiers and signal strengths, cell pilot identifiers corresponding to the signal strengths that fall within each segment. It should be noted that when one cell pilot identifier corresponds to more than one signal strength, only a strongest signal strength of the more than one signal strength is selected for collection. For example, if the strongest signal strength of a cell with pilot identifier 19 within the area is −75 dbm, and the weakest signal strength is −100 dbm, in the collection process, −75 dbm signal strengths are selected for collection, and the pilot identifier 19 is mapped to the −80 dbm to −70 dbm segment.

Step S204 may specifically include:

configuring a same color for cells whose signal strength corresponding to cell pilot identifier fall within a same segment, and configuring different colors for cells whose signal strength corresponding to cell pilot identifier fall within different segments; or configuring a same color for (or mapping a same color to) cell pilot identifiers corresponding to signal strengths that fall within a same segment, and configuring different colors for (or mapping different colors to) cell pilot identifiers corresponding to signal strengths that fall within different segments; and configuring a same color for cells whose signal strength corresponding to cell pilot identifier fall within a same segment, and configuring different colors for cells whose signal strength corresponding to cell pilot identifier fall within different segments.

Take the segments divided in step (1) under step 202 as an example: red may be configured for (or mapped to) cell pilot identifiers corresponding to signal strengths that fall within the ≥−70 dbm segment; purple may be configured for (or mapped to) cell pilot identifiers corresponding to signal strengths that fall within the −80 dbm to −70 dbm segment; green may be configured for (or mapped to) cell pilot identifiers corresponding to signal strengths that fall within the −90 dbm to −80 dbm segment; and corresponding colors are configured (for example, filled) respectively for cells corresponding to (or represented by) cell pilot identifiers.

In other embodiments based on this embodiment, the preprocessed map or the map of abnormal cells may also be output (or displayed).

In the embodiment of the present invention, a map of abnormal cells of the target pilot pollution area is generated according to the cell pilot identifiers and the signal strength corresponding to the pilot identifier of each cell; a picture is used for visual expression, and it is unnecessary to review test data and view the review connection, and the analysis efficiency is high.

Figure 3:
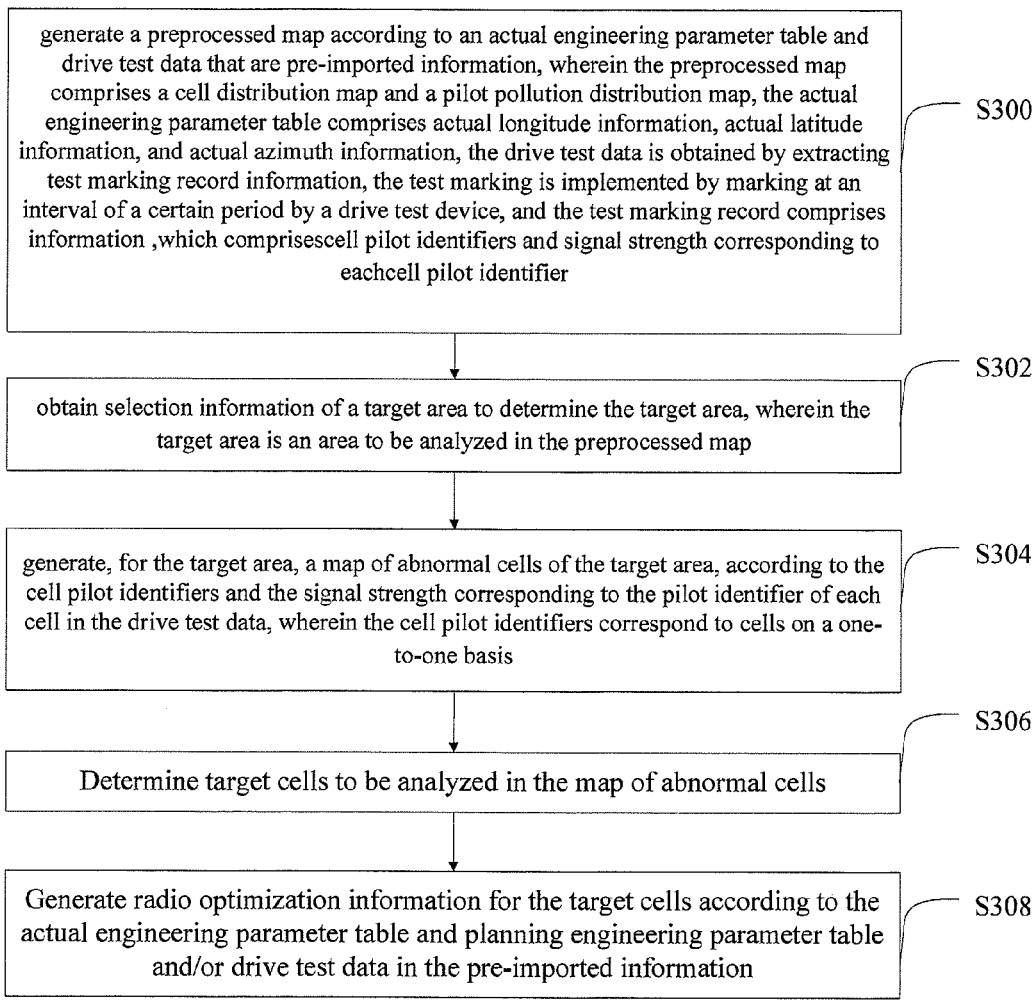
FIG. 3 is a schematic flowchart of another embodiment of a method for analyzing pilot pollution according to the present invention.

FIG. 3 is a schematic flowchart of another embodiment of a method for analyzing pilot pollution according to the present invention. The pre-imported information in this embodiment further includes a planning engineering parameter table, and the method for analyzing pilot pollution includes the following:

S300. Generate a preprocessed map according to an actual engineering parameter table and drive test data that are in pre-imported information, where the preprocessed map includes a cell distribution map and a pilot pollution distribution map, the actual engineering parameter table includes actual longitude information, actual latitude information, and actual azimuth information, the drive test data is obtained by extracting test marking record information, the test marking is obtained by marking at an interval of a certain period by a drive test device, and the test marking record comprises information, which comprise cell pilot identifiers and signal strength corresponding to each cell pilot identifier.

S302. Obtain selection information of a target area to determine the target area, where the target area is an area to be analyzed in the preprocessed map.

S304. Generate, for the target area, a map of abnormal cells of the target area according to the cell pilot identifiers and the signal strength corresponding to the pilot identifier of each cell collected pilot identifier of each cell in the drive test data, where the cell pilot identifiers correspond to cells on a one-to-one basis.

S306. Determine target cells to be analyzed in the map of abnormal cells.

S308. Generate radio optimization information for the target cells according to the actual engineering parameter table and planning engineering parameter table and/or drive test data in the pre-imported information.

The descriptions about steps S300, S302, and S304 are the same as the description about steps S100, S102, and S104, and are not further given here.

In step S306, the selecting/determining operation (for example, keyboard, mouse, and touch interface input) based on the preprocessed map of the user may be received to determine the target cells to be analyzed (for example, the pilot pollution area to be analyzed in the preprocessed map), or the target cells to be analyzed may be automatically determined through a preprogrammed program.

Step S308 may include: extracting actual parameters and planning parameters, which are related to the target cells, from the actual engineering parameter table and planning engineering parameter table and/or drive test data in the pre-imported information; and making a judgment according to the actual parameters and planning parameters to generate radio optimization information. Specifically, this step may include the following:

S3080. For a target cell, extract, from the planning engineering parameter table, the planned azimuth, electrical tilt angle, and mechanical tilt angle of the cell; and extract, from the actual engineering parameters, the actual azimuth, electrical tilt angle, and mechanical tilt angle of the cell.

S3082. Calculate the planned azimuth and actual azimuth and make comparison on them, and if they are consistent, it is not recommended to adjust azimuth; or if they are inconsistent, compare the optimization records of the cell (the optimization records are extracted from the actual engineering parameter table); if the azimuth in the optimization record is already optimized, it is not recommended to adjust the azimuth, or if the azimuth in the optimization record is not optimized, it is recommended to adjust the azimuth from the actual azimuth to the planned azimuth.

S3084. Calculate the sum of the planned electrical tilt angle and planned mechanical tilt angle of the target cell, calculate the sum of the actual electrical tilt angle and actual mechanical tilt angle of the target cell, and calculate the difference between a planned sum and an actual sum. If the difference is 0, it is not recommended to perform adjustment; if the difference is a positive number and the electrical tilt angle plus the difference is not greater than 10°, it is recommended to increase the electrical tilt angle by the difference; if the difference is a positive number and the electrical tilt angle plus the difference is greater than 10°, it is recommended to increase the mechanical tilt angle by the difference; if the difference is a negative number and the electrical tilt angle minus the absolute value of the negative number is not smaller than 0°, it is recommended to reduce the electrical tilt angle by the absolute value of the negative number; if the difference is a negative number and the electrical tilt angle minus the absolute value of the negative number is smaller than 0°, it is recommended to reduce the mechanical tilt angle by the absolute value of the negative number.

S3086. If it is not recommended to adjust the azimuth and the electrical tilt angle, calculate the distance between the cell and a point which is physically farthest away from the cell in the actual coverage of the target cell, and calculate the distance between the cell and the point which is physically farthest away from the cell in the simulation effect diagram of the cell; if the difference between the former and the latter is a positive number and the electrical tilt angle minus 2° is not smaller than 0°, it is recommended to reduce the electrical tilt angle by 2°; if the difference between the former and the latter is a positive number and the electrical tilt angle minus 2° is smaller than 0°, it is recommended to reduce the mechanical tilt angle by 2°; if the difference between the former and the latter is a negative number and the electrical tilt angle plus 2° is not greater than 10°, it is recommended to increase the electrical tilt angle by 2°; if the difference between the former and the latter is a negative number and the electrical tilt angle plus 2° is greater than 10°, it is recommended to increase the mechanical tilt angle by 2°.

S3088. Compare the pilot power in the actual engineering parameter table with the pilot power in the planning engineering parameter table; if they are consistent, it is not recommended to change pilot power; if they are inconsistent, retrieve the optimization record in the actual engineering parameters; if the pilot power is not changed, it is recommended to change actual pilot power to planned pilot power; if the pilot power is changed, it is not recommended to readjust the pilot power.

It should be noted that not all of the steps S3080 to S3088 need to be performed and that only one or several steps thereof may be separately performed to generate corresponding radio optimization information. For example, only the optimization record in the actual engineering parameter table is extracted, and only a recommendation about adjusting pilot power is calculated and generated.

S3090. Generate related radio optimization information in combination with the recommendations in each of the above steps. The radio optimization information may include: any one or any combination of the following recommendations.

(i) recommendation about adjusting the azimuth;
(ii) recommendation about adjusting the electrical tilt angle;
(iii) recommendation about adjusting the mechanical tilt angle;
(iv) recommendation about adjusting pilot power; and
(v) historical optimization record.

Generation of the above radio optimization information may be triggered by user operations, for example, keyboard, mouse, and touch interface selection, and may also be triggered automatically by software programming.

In the embodiment of the present invention, radio optimization information is generated according to pre-imported information, and related information is output to an analyzer. The analysis efficiency is high, and the experience requirement is reduced.

In other embodiments of the present invention, generated radio optimization information may further include: a field picture and/or a simulation effect diagram in extracted pre-imported information, and/or a real coverage diagram generated by calculating the real coverage of the cell according to the drive test data. Thereby, related files or information may be output according to requirements, avoiding operations of multiple files.

Generation of the above radio optimization information may be triggered by user operations, for example, keyboard, mouse, and touch interface selection, or may also be triggered automatically by software programming.

Figure 4:
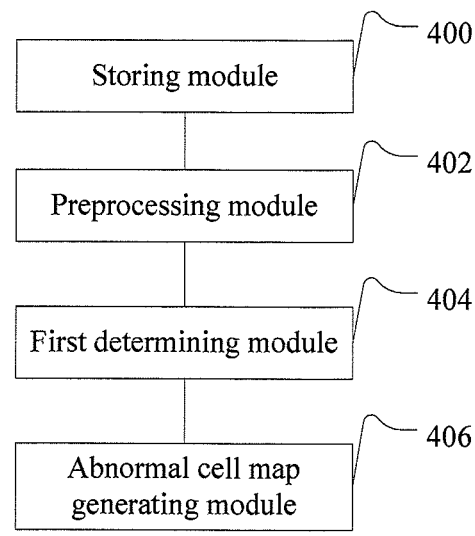
FIG. 4 is a schematic structural diagram of an embodiment of an apparatus for analyzing pilot pollution according to the present invention.

FIG. 4 is a schematic structural diagram of an embodiment of an apparatus for analyzing pilot pollution according to the present invention. The apparatus includes:

a storing module 400, adapted to store pre-imported information, where the pre-imported information includes an actual engineering parameter table and drive test data, where the actual engineering parameter table includes actual longitude information, actual latitude information, and actual azimuth information, the drive test data is obtained by extracting test marking record information, the test marking is obtained by marking at an interval of a certain period by a drive test device, and the test marking record comprises information, which comprise cell pilot identifiers and signal strength corresponding to each cell pilot identifier;

a preprocessing module 402, adapted to generate a preprocessed map according to the actual engineering parameter table and drive test data, where the preprocessed map includes a cell distribution map and a pilot pollution distribution map;

a first determining module 404, adapted to obtain selection information of a target area to determine the target area, where the target area is an area to be analyzed in the preprocessed map; and an abnormal cell map generating module 406, adapted to generate a map of abnormal cells of the target area according to the cell pilot identifiers and the signal strength corresponding to the pilot identifier of each cell collected pilot identifier of each cell in the drive test data, where the cell pilot identifiers correspond to cells on a one-to-one basis.

The pre-imported information includes at least the actual engineering parameter table and the drive test data, and in some circumstances (for example, if a field picture and/or a simulation effect diagram needs to be output), may include any one or any combination of a planning engineering parameter table, a simulation effect diagram, or a field picture.

The preprocessing module 402 may include:
a first preprocessing module, adapted to extract longitudes, latitudes, and azimuths from the actual engineering parameter table to generate a cell distribution map; and
a second preprocessing module, adapted to calculate the drive test data according to the pilot pollution algorithm (for example, the number of pilots that are 10 dbm weaker than the strongest pilot is greater than or equal to 3) to generate a pilot pollution distribution map.

The preprocessed map and the map of abnormal cells may be displayed on a display, where the cell distribution map and pilot pollution distribution map in the preprocessed map may be displayed sequentially or simultaneously, or may also be displayed in the form of a picture after image synthesis.

The first determining module 404 may determine the target area (for example, the pilot pollution area to be analyzed in the preprocessed map) in the following way: displaying the preprocessed map, and then receiving the selecting/determining operation (for example, keyboard, mouse, and touch interface input) based on the preprocessed map of the user to obtain the selection information of the target area to be analyzed. The first determining module 404 may also obtain the selection information of the target area through a preprogrammed program module (such as a judging module) to automatically determine the target area to be analyzed.

In other embodiments of the present invention, the apparatus may also include a first outputting module, adapted to output (or display) the preprocessed map or the map of abnormal cells.

Figure 5:
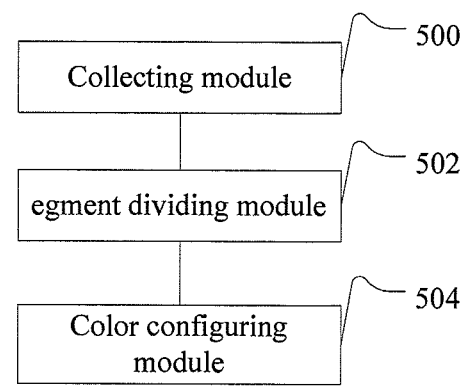
FIG. 5 is a schematic structural diagram of an abnormal cell map generating module according to the present invention.

A schematic structural diagram of the abnormal cell map generating module 406 in this embodiment is shown in FIG. 5, where the abnormal cell map generating module 406 includes:

a collecting module 500, adapted to extract a pilot identifier of each test-marked cell and the signal strength corresponding to the pilot identifier of each test-marked cell in the drive test data, and collect the pilot identifier of each test-marked cell and the signal strength corresponding to the pilot identifier of each test-marked cell in the drive test data in the target area;

a segment dividing module 502, adapted to divide the collected pilot identifier of each cell and the signal strength corresponding to the pilot identifier of each cell into segments; and a color configuring module 504, adapted to configure colors for the abnormal cells of the target area according to the segments.

What is stored in the drive test data are the service process and the cell signal which is received by the UE in test service, and the cell signal is generated by marking (namely, test-marking) at an interval of a certain period (usually 50 ms). All signal strengths within a receivable range (depending on capabilities of the terminal, usually above −115 dbm) can be received, while all the signals are transmitted by independent cells. The identifier of each cell signal is different (the identifier is a cell pilot identifier). A module extracts, from the test data, the cell pilot identifier and signal strength of each point, and then collects and calculates the cell pilot identifiers and signal strengths in the pilot pollution area (for example, an area with 5 pilots that are 10 dbm weaker than the strongest pilot).

The segment dividing module 502 may include: a first module and a second module.

The first module is adapted to divide the collected signal strengths into more than one segment. For example, the signal strengths may be divided into 3 segments: −70 dbm (greater than or equal to −70 dbm) segment, −80 dbm to −70 dbm (greater than or equal to −80 dbm and smaller than −70 dbm) segment, and −90 dbm to −80 dbm (greater than or equal to −90 dbm and smaller than −80 dbm) segment.

The second module is adapted to collect, according to the divided segments, cell pilot identifiers corresponding to the signal strengths that fall within each segment. For example, the second module collects, according to the 3 segments divided by the first module and the mapping between cell pilot identifiers and signal strengths, cell pilot identifiers corresponding to the signal strengths that fall within each segment. In addition, the second module may include a signal strength selecting module, adapted to: when one cell pilot identifier corresponds to more than one signal strength, select a strongest signal strength of the more than one signal strength for collection. For example, if the strongest signal strength of a cell with pilot identifier 19 within the target area is −75 dbm, and the weakest signal strength is −100 dbm, in the collection process, −75 dbm signal strengths are selected for collection, and the pilot identifier 19 is mapped to the −80 dbm to −70 dbm segment.

The color configuring module 504 may include a first color configuring module, or include a first color configuring module and a second color configuring module.

The first color configuring module is adapted to configure a same color for cells whose signal strength corresponding to cell pilot identifier fall within a same segment, and configure different colors for cells whose signal strength corresponding to cell pilot identifier fall within different segments.

The second color configuring module is adapted to configure (map) a same color for cell pilot identifiers corresponding to signal strengths that fall within a same segment, and configure (map) different colors for cell pilot identifiers corresponding to signal strengths that fall within different segments.

Take the segments divided by the segment dividing module 502 as an example: red may be configured for (or mapped to) cell pilot identifiers corresponding to signal strengths that fall within the ≥−70 dbm segment; purple may be configured for (or mapped to) cell pilot identifiers corresponding to signal strengths that fall within the −80 dbm to −70 dbm segment; green may be configured for (or mapped to) cell pilot identifiers corresponding to signal strengths that fall within the −90 dbm to −80 dbm segment; and corresponding colors are configured (for example, filled) respectively for cells corresponding to (or represented by) cell pilot identifiers.

In other embodiments based on this embodiment, the apparatus may also include a first outputting module, adapted to output (or display) the preprocessed map or the map of abnormal cells.

Figure 6:
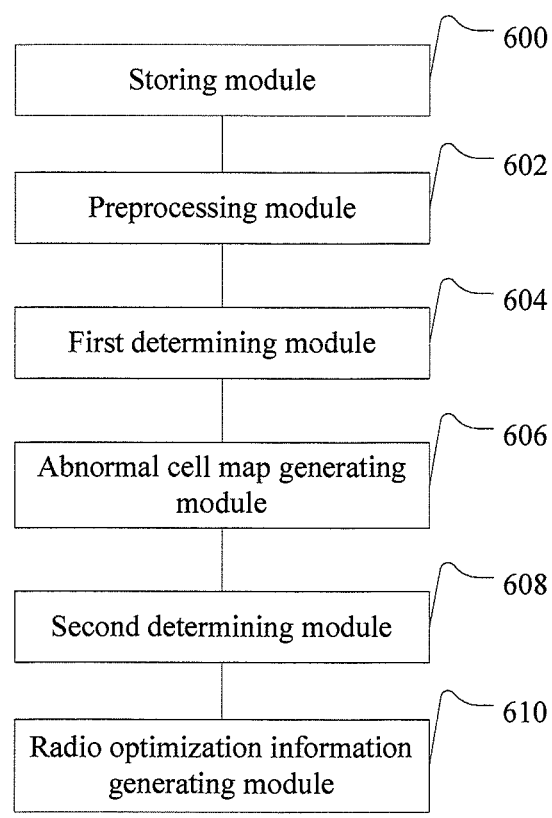
FIG. 6 is a schematic structural diagram of another embodiment of an apparatus for analyzing pilot pollution according to the present invention.

FIG. 6 is a schematic structural diagram of another embodiment of an apparatus for analyzing pilot pollution according to the present invention. The apparatus includes:

a storing module 600, adapted to store pre-imported information, where the pre-imported information includes an actual engineering parameter table, a planning engineering parameter table, and drive test data, where the actual engineering parameter table includes actual longitude information, actual latitude information, and actual azimuth information, the drive test data is obtained by extracting test marking record information, the test marking is obtained by marking at an interval of a certain period by a drive test device, and the test marking record comprises information, which comprise cell pilot identifiers and signal strength corresponding to each cell pilot identifier;

a preprocessing module 602, adapted to generate a preprocessed map according to the actual engineering parameter table and drive test data, where the preprocessed map includes a cell distribution map and a pilot pollution distribution map;

a first determining module 604, adapted to obtain selection information of a target area to determine the target area, where the target area is an area to be analyzed in the preprocessed map;

an abnormal cell map generating module 606, adapted to generate a map of abnormal cells of the target area according to the cell pilot identifiers and the signal strength corresponding to the pilot identifier of each cell collected pilot identifier of each cell in the drive test data, where the cell pilot identifiers correspond to cells on a one-to-one basis;

a second determining module 608, adapted to determine target cells to be analyzed in the map of abnormal cells; and a radio optimization information generating module 610, adapted to generate radio optimization information for the target cells according to the actual engineering parameter table and planning engineering parameter table and/or drive test data in the pre-imported information.

The descriptions about the storing module 600, preprocessing module 602, first determining module 604, and abnormal cell map generating module 606 are the same as the descriptions about the storing module 400, preprocessing module 402, first determining module 404, and abnormal cell map generating module 406, and are not further provided here.

The second determining module 608 may determine target cells to be analyzed (for example, the pilot pollution area to be analyzed in the preprocessed map) by displaying the preprocessed map and according to the received selecting/determining operation (for example, keyboard, mouse, and touch interface input) based on the preprocessed map of the user, and may also automatically determine the target cells to be analyzed through a preprogrammed program module.

For the calculation performed by the radio optimization information generating module 610 for the target cells, reference may be made to the description in the method embodiment shown in FIG. 3, and the description is not further provided here.

In other embodiments based on this embodiment, the apparatus may also include a second outputting module, adapted to output (or display) the preprocessed map, the map of abnormal cells, or radio optimization information, and so on.

In other embodiments of the present invention, the pre-imported information further includes a field picture and/or a simulation effect diagram. The radio optimization information generating module may be further adapted to extract the field picture and/or simulation effect diagram from the pre-imported information, and/or calculate the real coverage of the cells according to the drive test data and generate a real coverage diagram. Generation of the above radio optimization information may be triggered by user operations, for example, keyboard, mouse, and touch interface selection, or may also be triggered automatically by a corresponding software-programmed module.

Persons skilled in the art may understand that all or a part of the processes of the methods in the embodiments may be implemented by a computer program instructing relevant hardware. The program may be stored in a computer readable storage medium. When the program is run, the processes of each method in the embodiments are performed. The storage medium may be a magnetic disk, an optical disk, a Read-Only Memory (Read-Only Memory, ROM), a Random Access Memory (Read-Only Memory, RAM), and the like.

Disclosed above are merely exemplary embodiments of the present invention, but are not intended to limit the scope of the present invention. Therefore, equivalent variations made according to the claims of the present invention shall fall within the protection scope of the present invention.

What is claimed is:

1. A method for analyzing and reducing pilot pollution, the method comprising:
   collecting drive test data transmitted by cells using a drive test device, the drive test data obtained by marking at an interval of a certain period by the drive test device and detecting cell pilot identifiers and signal strength corresponding to each cell pilot identifier for the cells within range of the drive test device during the interval;
   generating a preprocessed map according to an engineering parameter table and the drive test data, wherein the preprocessed map comprises a cell distribution map and a pilot pollution distribution map, the engineering parameter table comprising longitude information, latitude information, and azimuth information;
   generating, for a target area to be analyzed in the preprocessed map, a map of abnormal cells of the target area according to the cell pilot identifiers and the signal strength corresponding to the pilot identifier of each cell in the target area, wherein the cell pilot identifiers correspond to cells on a one-to-one basis;
   generating radio optimization information for one or more target cells in the map of abnormal cells; and
   adjusting electrical and mechanical parameters of the one or more target cells in response to the radio optimization information in order to reduce pilot pollution in the target area.

2. The method according to claim 1, wherein generating a map of abnormal cells of the target area according to the cell pilot identifiers and the signal strength corresponding to the pilot identifier of each cell in the drive test data comprises:
   extracting a pilot identifier of each cell and a signal strength corresponding to the pilot identifier of each cell in the drive test data;
   dividing the collected pilot identifier of each cell and the signal strength corresponding to the pilot identifier of each cell into segments; and
   configuring colors for the abnormal cells of the target area according to the divided segments.

3. The method according to claim 2, wherein dividing the collected pilot identifier of each cell and the signal strength corresponding to the pilot identifier of each cell into segments comprises:
   dividing the signal strength corresponding to the collected pilot identifier of each cell into more than one segment; and
   collecting, according to the divided segments, the collected pilot identifier of each cell corresponding to the signal strength that fall within the segments, in order to divide the collected pilot identifier of each cell into segments.

4. The method according to claim 3, wherein collecting, according to the divided segments, the collected pilot identifier of each cell corresponding to the signal strengths that fall within the segments, in order to divide the collected pilot identifier of each cell into segments comprises: when one cell pilot identifier corresponds to more than one signal strength, selecting only a strongest signal strength of the more than one signal strengths for collection.

5. The method according to claim 2, wherein configuring colors for the abnormal cells of the target area according to the divided segments comprises:
   configuring a same color for cells whose signal strength corresponds to cell pilot identifiers that fall within a same segment, and configuring different colors for cells whose signal strength corresponds to cell pilot identifiers that fall within different segments; or
   configuring a same color for cell pilot identifiers corresponding to signal strengths that fall within a same segment, and configuring different colors for cell pilot identifiers corresponding to signal strengths that fall within different segments; and configuring a same color for cells whose signal strength corresponds to cell pilot identifiers that fall within a same segment, and configuring different colors for cells whose signal strength corresponds to cell pilot identifiers that fall within different segments.

6. The method according to claim 1, wherein the preprocessed map further comprises a planning engineering parameter table, and after generating a map of abnormal cells of the target area according to the cell pilot identifiers and the signal strength corresponding to the pilot identifier of each test-marked cell in the drive test data, the method further comprises:

generating radio optimization information for the one or more target cells according to the engineering parameter table and planning engineering parameter table and/or drive test data.

7. An apparatus for analyzing and reducing pilot pollution, the apparatus comprising:

a memory configured to store data and instruction code;

a storing module, configured to store an engineering parameter table and drive test data, wherein the engineering parameter table comprises longitude information, latitude information, and azimuth information, the drive test data transmitted by cells within range of a drive test device and obtained by marking at an interval of a certain period and detecting cell pilot identifiers and signal strength corresponding to each cell pilot identifier for the cells within range of the drive test device during the interval;

a preprocessing module, upon executing the instruction code, configured to generate a preprocessed map according to the engineering parameter table and drive test data, wherein the preprocessed map comprises a cell distribution map and a pilot pollution distribution map;

an abnormal cell map generating module, upon executing the instruction code, configured to generate, for a target area to be analyzed in the preprocessed map, a map of abnormal cells of the target area according to the cell pilot identifiers and the signal strength corresponding to the pilot identifier of each cell in the target area, wherein the cell pilot identifiers correspond to cells on a one-to-one basis; and a radio optimization module, upon executing the instruction code, configured to:

generate radio optimization information for one or more target cells in the map of abnormal cells; and adjust electrical and mechanical parameters of the one or more target cells in response to the radio optimization information in order to reduce pilot pollution in the target area.

8. The apparatus according to claim 7, wherein the abnormal cell map generating module comprises:

a collecting module, configured to extract a pilot identifier of each cell and the signal strength corresponding to the pilot identifier of each cell in the drive test data, and collect the pilot identifier of each cell and the signal strength corresponding to the pilot identifier of each cell in the drive test data in the target area;

a segment dividing module, configured to divide the collected pilot identifier of each cell and the signal strength corresponding to the pilot identifier of each cell into segments; and a color configuring module, configured to configure colors for the abnormal cells of the target area according to the divided segments.

9. The apparatus according to claim 8, wherein the segment dividing module comprises:

a first module, configured to divide the collected signal strengths into more than one segment; and a second module, configured to collect, according to the divided segments, cell pilot identifiers corresponding to the signal strengths that fall within the segments, in order to divide the collected pilot identifier of each cell into segments.

10. The apparatus according to claim 9, wherein the second module comprises:

a signal strength selecting module, configured to: when one cell pilot identifier corresponds to more than one signal strength, select only a strongest signal strength of the more than one signal strength for collection.

11. The apparatus according to claim 8, wherein the color configuring module comprises a first color configuring module, or comprises a first color configuring module and a second color configuring module, wherein:

the first color configuring module is configured to configure a same color for cells whose signal strength corresponds to cell pilot identifiers that fall within a same segment, and configure different colors for cells whose signal strength corresponds to cell pilot identifiers that fall within different segments; and the second color configuring module is configured to configure a same color for cell pilot identifiers corresponding to signal strengths that fall within a same segment, and configure different colors for cell pilot identifiers corresponding to signal strengths that fall within different segments.

12. The apparatus according to claim 7, wherein the apparatus further comprises:

a first outputting module, configured to output the preprocessed map or the map of abnormal cells.

13. The apparatus according to claim 7 wherein the storing module further comprises a planning engineering parameter table, wherein:

the radio optimization module is configured to generate radio optimization information for the one or more target cells according to the engineering parameter table and planning engineering parameter table and/or drive test data.

* * * * *